March 31, 1925.

J. B. HOWE

CARD FEEDER

Filed May 15, 1923

Inventor
Joseph B. Howe
by Roberts, Roberts & Cushman
his Attorneys

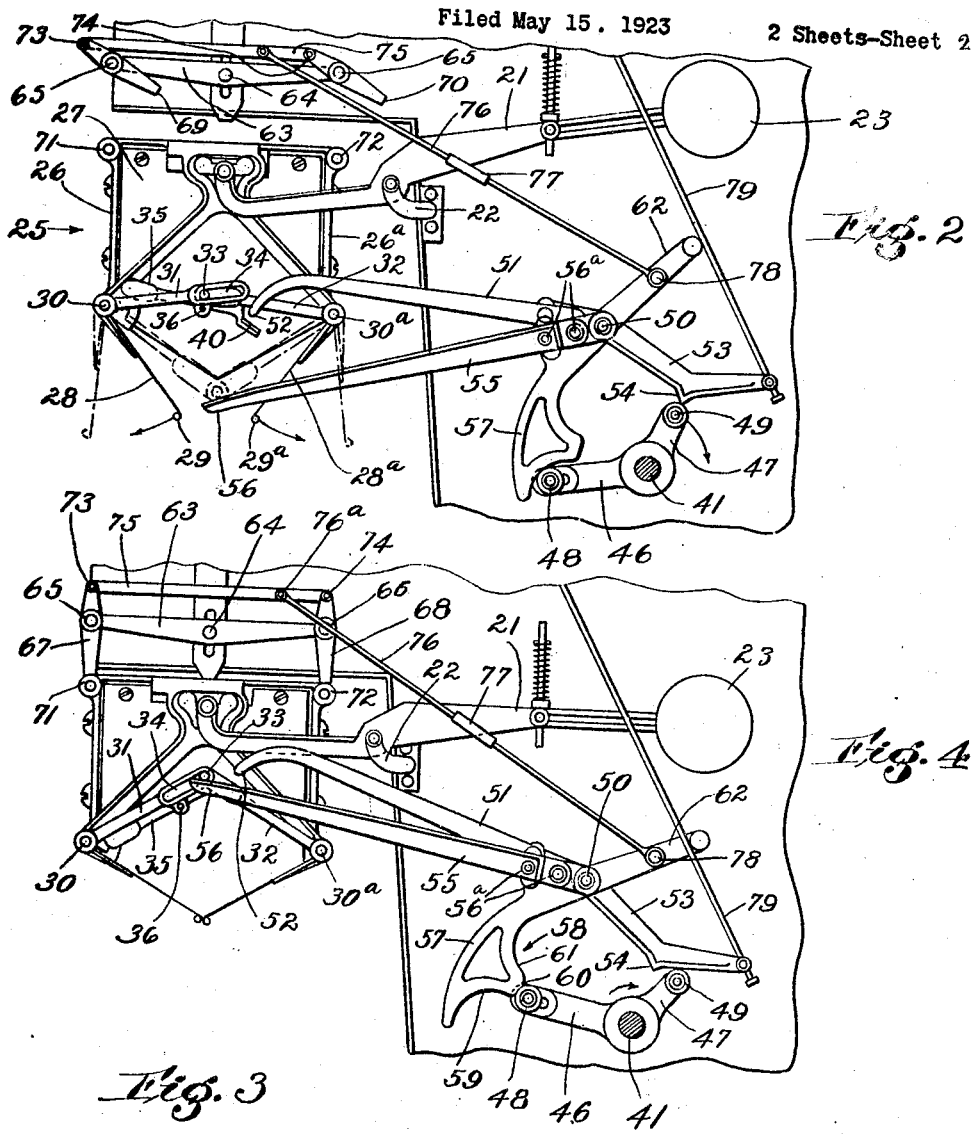

Patented Mar. 31, 1925.

1,531,944

UNITED STATES PATENT OFFICE.

JOSEPH B. HOWE, OF WORCESTER, MASSACHUSETTS, ASSIGNOR TO GEORGE S. HARWOOD & SON, OF BOSTON, MASSACHUSETTS, A COPARTNERSHIP CONSISTING OF SYDNEY HARWOOD AND JOHN H. HARWOOD.

CARD FEEDER.

Application filed May 15, 1923. Serial No. 639,103.

*To all whom it may concern:*

Be it known that I, JOSEPH B. HOWE, a citizen of the United States of America, and resident of Worcester, in the county of Worcester and State of Massachusetts, have invented new and useful Improvements in Card Feeders, of which the following is a specification.

This invention pertains to feeding mechanism for carding machines and relates more particularly to automatic weighing mechanism for use in such machines.

For convenience in illustration the present invention is shown as applied to a Bramwell feeder provided with automatic weighing mechanism of the general character disclosed in the patent to Howe No. 1,434,058, October 31, 1922.

Principal objects of the invention are to provide means, operating independently of the tipping of the scale beam under load and which normally imposes no restraint upon the scale beam such as would interfere with the delicacy or accuracy of the weighing operation, for controlling the opening and closing of the scale pan; to provide for the independent timing and adjustment of the means for opening the pan and the pan closing and beam restoring means; and to provide means for quickly and positively damping the oscillations of the scale pan about its pivotal axis on the beam when the pan is restored to normal position after dumping, but which does not interfere with its freedom to turn on its axis during loading and descent.

In the accompanying drawings Fig. 1 is an end elevation of a Bramwell feeder embodying the present invention, the scale pan being shown in loading position;

Fig. 2 is a fragmentary end elevation, to larger scale, showing the scale pan in dumping position and just beginning to open;

Fig. 3 is a fragmentary end elevation of the scale pan and associated parts, showing the pan fully open; and Fig. 4 is a view similar to Fig. 2 but showing the closed pan at the instant of its restoration to loading position.

Figure 1:
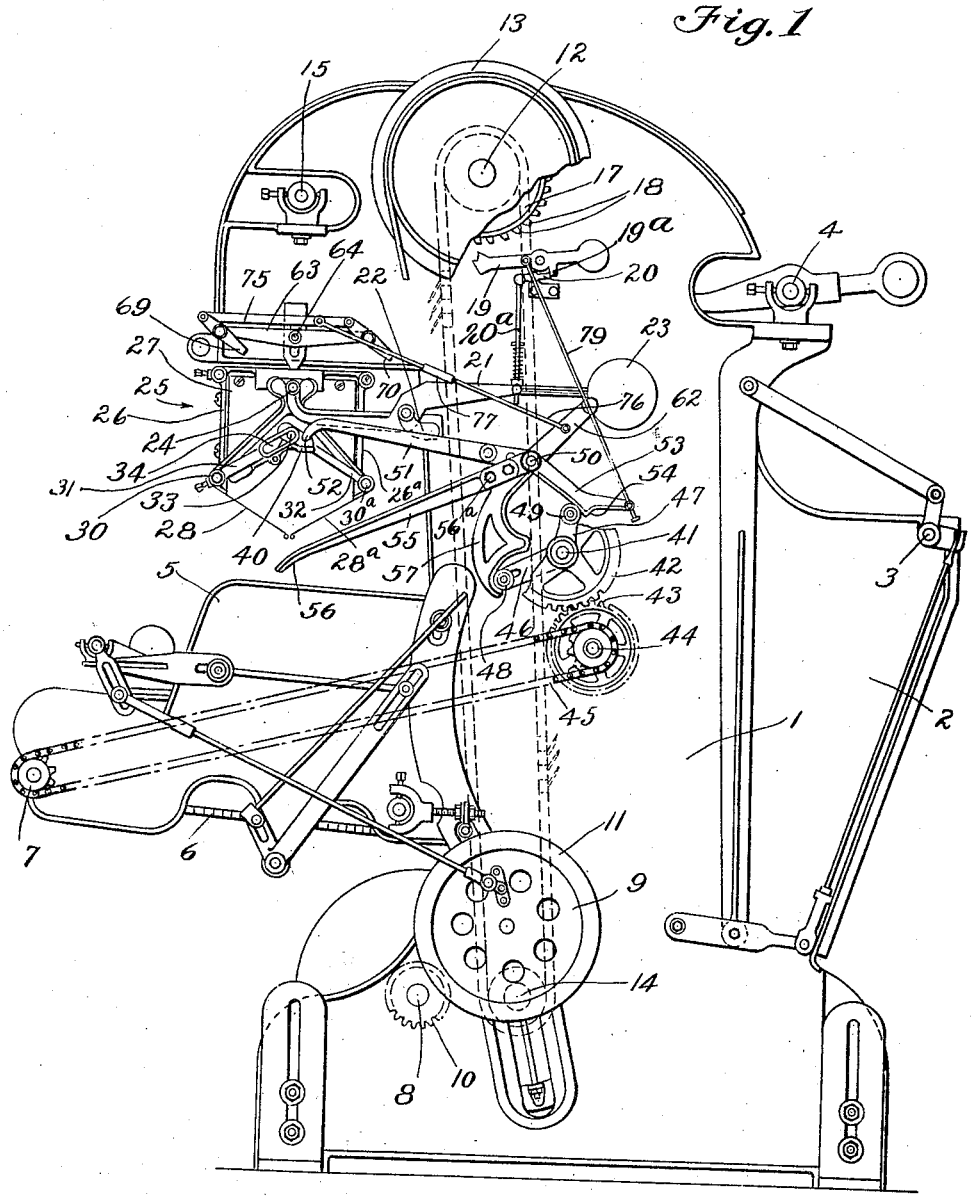

Referring to the drawings, the numeral 1 indicates one end of the frame of a Bramwell feeder of substantially usual type. This feeder is provided with a bin 2 at its rear end for the reception of the fiber to be treated. A shaft 3 extends across the upper portion of the bin and supports a vibrating apron, not shown, while a shaft 4 is journalled at the upper rear portion of the frame and supports and actuates an oscillating comb, not shown.

At the front of the machine a forwardly projecting bracket 5 is provided which supports an endless conveyor 6 which is driven by means of a shaft 7 receiving its motion from a carding machine, not shown, with which the machine herein disclosed is associated. A main drive shaft 8 is journalled in bearings in the lower part of the frame and this shaft is provided with a pulley or other driving means receiving its motion from any desired source, while a shaft 9 is journalled in bearings in the frame just above and to the rear of the main shaft 8 and is driven by means of a gear 10 carried by the main shaft. A pulley 11 is secured to the shaft 9. A shaft 12 is journalled in bearings at the upper part of the frame and this shaft is provided with a clutch mechanism, comprising a pulley 13 which is driven by means of a belt from the pulley 11. A shaft 14 extends across the frame at its lower part and is provided with a roller or other suitable means for guiding an endless spike apron which passes over a driving roller mounted on the shaft 12. At the front of the machine near its top a shaft 15 is journalled which receives intermittent oscillating motion from the shaft 12.

The clutch mechanism for driving the shaft 12 comprises a disengaging element 17 provided with projecting teeth 18, this clutch being, if desired, of the type disclosed in the patent to Howe No. 998,003 July 18, 1911. The disengaging element 17 is actuated to stop the shaft 12 by means of a counterweighted dog 19 which is normally held in inoperative position by means of a trip device 20, having an arcuate end engaging a lug 19ª on the dog. The other end of the trip device is connected to a rod 20ª passing downward through an opening in the arm 21 of the scale beam and provided with a spring which bears resiliently against the arm.

The weighing mechanism comprises a composite scale beam consisting of like members such as 21 disposed at opposite sides of the machine and fulcrumed on supporting brackets such as 22. The members 21 are preferably counterweighted as indicated as at 23 and are turned upwardly at their forward ends to provide bearings at 24 for the opposite ends of a pivotally supported scale pan 25.

This scale pan is of the dumping variety, open at the top and having front and rear walls 26, 26ª and end walls 27. The bottom of the pan is normally closed and preferably comprises the bottom wall members 28, 28ª respectively which normally engage each other along their edges 29, 29ª. The members 28, 28ª are secured to shafts 30, 30ª, respectively, journalled at the lower edges of the front and rear members 26, 26ª.

The shafts 30 and 30ª are actuated to move the members 28, 28ª to and from closed position by means of levers 31, 32 respectively. Member 32 is provided at its rear extremity with an outwardly projecting pin 33 which is received in an elongate slot 34 in the free extremity of the lever 31. Preferably the pin 33 is adjustable longitudinally of the lever 32, although this is not essential.

When the pan occupies the position shown in Fig. 4, the pin 33 is locked in the upper end of the slot 34 by means of a latch 35. This latch consists of a lever fulcrumed at 36 upon a bracket carried by the lever 31 and is preferably counterweighted at 38. At its opposite end this latch lever is furnished with the stop projection or abutment 39 which contacts with the pin 33 and is further provided with an extension 40 for engagement by an actuating element. A stop lug 37 projects from the end of the pan in a position to be engaged at times by the counterweighted end 38 of the latch lever in a manner which will hereinafter be more fully described.

A shaft 41 is journalled in suitable bearings in the end frame of the machine and a gear 42 is secured to this shaft. This gear meshes with a gear 43 mounted on a stub shaft 44 secured to the end frame of the machine. A sprocket wheel is connected to the gear 43 and is driven by means of a chain 45 which passes about a sprocket wheel on the shaft 7.

The shaft 41 is furnished with a pair of angularly disposed crank arms 46, 47, respectively provided with crank pins preferably consisting of freely turning rolls 48, 49, respectively.

A shaft 50 is secured to the machine frame at a point above and slightly forward of the shaft 41 and upon this shaft, pan opening and closing levers are mounted. The pan opening lever comprises the forwardly extending arm 51 whose forward extremity 52 is normally positioned just above but out of contact with the latch extension 40. This lever also comprises the rearwardly extending arm 53 having the cam 54 which is engageable by the roll 49 as the latter turns with the shaft 41, such engagement acting to turn the lever in a counter clockwise direction so that its forward end 52 is brought into operative engagement with the latch extension 40.

The pan closing lever comprises the forwardly directed arm 55 whose forward extremity 56 is normally positioned in the plane of movement of the pin 33 and at a point at least as low as the lower limit of the movement of said pin. Preferably the arm 55 of this lever is formed separately from the remainder thereof and may be adjusted by means of bolts 56ª passing through slots in the main body of the lever.

The pan closing lever also comprises the downwardly extending arm 57 which is provided with the cam 58. This cam comprises the riser 59, the dwell 60 and the descending portion 61, and lies in the plane of rotation of the crank pin roll 48, the parts being so disposed that contact of the roll with the cam causes the lever to swing in a clockwise direction. Preferably the roll 48 is adjustable longitudinally of the crank arm 46 to permit variation in the movement of the pan closing lever. This lever is furnished with an upwardly and rearwardly extending arm 62 whose purpose is more fully described hereafter.

A bridge member or bracket 63 is adjustably secured by means of a pin and slot connection, indicated at 64, to the frame of the machine at a point immediately above the pan. This bridge member is furnished with bearings 65, 66 at its opposite ends in which levers 67, 68 respectively are journalled. These levers are disposed in parallel relation and their lower extremities 69, 70 constitute stop elements for engagement with the upper edge of the pan at the points 71, 72 respectively.

The upper ends of the levers 67, 68 are pivotally connected at the points 73, 74, respectively, with the opposite ends of a link 75 which constrains the levers to turn synchronously. A link 76 is secured to the link 75 at the point 76ª, such link preferably being provided with a turn buckle 77 for adjusting its length and being connected at 78 to the arm 62 of the pan closing lever.

A link 79 connects the rear end of the arm 53 of the pan opening lever with the dog 19 for the purpose of resetting the dog at the proper time. A rod 20ª connects the trip member 20 with the scale beam 21 for tripping the dog 19 when the scale beam tips under load.

The operation of the device is substantially as follows. The shaft 7 is continuously driven through connections to the carding machine, while the main drive shaft 8 is driven from any suitable source of power, thus continuously driving the clutch pulley 13. The shaft 41 is also continuously driven through its connection with the shaft 7. When the dog 19 occupies the position shown in Fig. 1, the shaft 12 is clutched to the pulley 13 thereby driving the various instrumentalities carried by the shafts 3, 4 and 15, as well as the spike apron, and thus continuously lifting fiber from the bin 2 and dropping it into the scale pan 25 which at this time occupies the position shown in Fig. 1. When the pan has received its predetermined load the scale beam tips and through the rod 20ª releases the dog 19 which engages the teeth 18 of the member 17 thereby disengaging the clutch elements and causing shaft 12 to stop. Further dropping of the fiber into the scale pan now ceases until the shaft 12 is again started.

After the filled pan has descended it remains closed until rotation of shaft 41 brings the roll 49 into engagement with cam 54, whereupon the arm 51 is swung downwardly into engagement with the latch extension 40. This moves the abutment 39 out of the path of pin 33, whereupon the latter slides freely along the slot 34, allowing the bottom walls 28, 28ª of the pan to swing freely open thus dumping the material onto the conveyor 6.

When the pan is fully opened, the pin 33 occupies the position shown in Fig. 3, and in this position the counterweight 38 on the latch would tend to swing the abutment 39 into the path of the pin 33, thus preventing closing the pan. At this time, however, the counterweight engages the lug 37 so that such undesired movement of the latch is prevented.

The empty pan now remains in the position shown in Fig. 3 until the rotation of roll 48 brings it into engagement with the cam riser 59, gradually lifting the arm 55 of the pan closing lever. This arm raises the pin 33, and at the same time swings the scale beam upwardly to its normal position, the movement continuing until the pin 33 has reached the position shown in Fig. 4. At this instant the cam roll 48 encounters the dwell portion 60 of the cam, thus retaining the parts for a predetermined time in the position shown in Fig. 4. Movement of the pan closing lever as thus described causes the link 76, acting upon the connecting link 75, to swing the stop levers 67, 68 from the position of Fig. 2 to the position of Fig. 4 so that their lower extremities are disposed just above the opposite corners 71, 72 of the pan. As these levers are disposed upon opposite sides of the pivotal axis of the pan, and as they are of substantially the same length, their engagement with the pan immediately damps any oscillation of the pan about its axis, the parts being thus held by the dwell portion of the cam 58 for an interval sufficiently long to bring the pan substantially to rest. Continued movement of the roll 48 now carries it from off the dwell portion of the cam 58 and onto the descending portion 61, whereupon the lever arm 51 returns to normal position and the stop members 67 are swung back to the position shown in Fig. 2. The lower extremities 69, 70 of these stop members are of arcuate curvature, so that in swinging back to normal position they do not set up vibrations or oscillations in the pan.

When the pan resumes its normal position the latch lever, under the action of its counterweight, resumes the position shown in Fig. 4, thus locking the movable members 28 and 28ª in closed position.

The pan is thus restored to its normal load receiving position with the opening and closing devices free from contact therewith so that they do not in any manner interfere with the free movement of the pan or of the scale beam as the load is placed therein.

As the pan opening lever resumes its normal position it restores the dog 19 to the position shown in Fig. 1, thus restarting the shaft 12, the parts being so timed that the pan is returned to its normal load receiving position and comes to rest prior to the starting of shaft 12.

During the operation of the machine, the frictional engagement of the trip device 20 with the lug 19ª of the clutch dog acting through the rod 20ª, serves to damp vibrations of the scale beam such as might be transmitted thereto through the machine frame and which might otherwise cause the beam to tip prematurely.

I claim:—

1. A machine of the class described comprising a scale beam, a scale pan fulcrumed thereon, damping means, a constantly moving element, and means actuable by said element periodically to move the damping means into engagement with the scale pan whereby temporarily to prevent oscillations of the latter about its fulcrum.

2. A machine of the class described comprising a scale beam, a scale pan fulcrumed upon the beam, means for moving the pan to a predetermined position, normally inoperative damping means disposed above the pan, and means for moving said damping means downwardly into engagement with the pan while the latter occupies said predetermined position whereby to damp the oscillation of the pan about its fulcrum on the beam.

3. A machine of the class described comprising a scale beam, a dumping scale pan fulcrumed upon the beam, means for restoring the pan to normal, load receiving position after dumping, normally inoperative means movable into position to damp oscillations of the pan, and automatic means connected to the power restoring means for moving said damping means to and from operative position.

4. A machine of the class described comprising a scale beam, a dumping scale pan fulcrumed upon the beam, means for restoring the pan to normal, load receiving position after dumping, normally inoperative means engageable with the pan to damp its oscillations as it resumes normal position, and means moving in timed relation to the restoring means for automatically positioning the damping means in operative relation to the pan, and for subsequently restoring said damping means to inoperative position prior to delivery of the load into the pan.

5. A machine of the class described comprising a scale beam, a dumping scale pan fulcrumed upon the beam, means for restoring the pan to load receiving position after dumping, normally inoperative means for damping the oscillations of the empty pan as the latter resumes normal position, and means automatically acting in timed relation to the restoring means for moving the damping means into and out of operative position.

6. A machine of the class described comprising a scale beam, a dumping pan pivotally supported thereby, a rotary shaft, means actuated by the shaft automatically to restore the pan to normal load receiving position after tipping of the scale beam and dumping of the pan, a pivoted stop element engaging the empty pan as it resumes normal position whereby to damp the oscillations of the pan, and means controlled by said rotary shaft for disengaging the stop element from the pan prior to delivery of the load into the latter.

7. A machine of the class described comprising a scale beam, a dumping scale pan pivotally supported thereby, a power driven rotary shaft, means actuated by the shaft to restore the scale pan to load receiving position after the beam has tipped under load, a pivoted stop member normally positioned out of contact with the pan, and means also actuated by the rotary shaft for turning said stop member into position to engage the empty pan whereby to damp its oscillations as it resumes its load receiving position.

8. A machine of the class described comprising a scale beam, a dumping pan pivotally supported thereby, means for restoring the pan to normal load-receiving position after dumping, a lever disposed above the pan having a stop element normally positioned out of contact with the pan, and means connecting said lever with the pan restoring means for movement by the latter whereby to position its stop element for engagement with the pan.

9. A machine of the class described comprising a pivotally supported scale pan normally free to oscillate about its pivotal axis, and a pair of stop elements disposed respectively upon opposite sides of the pivotal axis of the pan and movable into engagement with the latter to prevent its oscillation.

10. A machine of the class described comprising a pivotally supported scale pan normally free to oscillate about its pivotal axis, a pair of stop levers disposed respectively upon opposite sides of the pivotal axis of the pan, and means for simultaneously swinging said levers into position to prevent oscillation of the pan.

11. A machine of the class described comprising a pivotally supported scale pan, normally free to oscillate about its pivotal axis, a pair of levers disposed respectively upon opposite sides of the pivotal axis of the pan, each lever terminating at one end in a stop element engageable with the pan, a link connecting the other ends of the respective levers, and means for moving the link whereby simultaneously to swing the levers to move their stop elements into and out of operative engagement with the pan.

12. A machine of the class described comprising a pivotally supported scale pan normally free to oscillate about its pivotal axis, a pair of levers pivoted above and substantially in the planes of the opposite sides of the pan respectively, the lower end of each lever being provided with a stop element for engagement with the upper part of the pan, a link connecting the upper ends of the respective levers, and means for actuating the link whereby normally to hold the levers with their stop elements out of contact with the pan, but at intervals, simultaneously to swing them into engagement with the pan.

13. A machine of the class described comprising a scale beam and a dumping pan pivotally supported thereby, a power actuated lever for restoring the scale beam to normal position after dumping of the pan, normally inoperative damping devices for stopping oscillation of the pan about its pivotal axis, and a link connection between the power actuated lever and said damping devices to render the latter operative as the scale beam reaches normal position.

14. A machine of the class described comprising a scale beam and a dumping scale pan pivotally supported thereby, a power actuated member for restoring the beam to normal position after the dumping of the pan, a pair of levers provided respectively with stop elements normally out of engagement with the pan, and means connecting the power actuated member and the levers whereby simultaneously to move the latter to bring their stop elements into engagement with the pan as the beam resumes normal position.

15. A machine of the class comprising a scale pan mounted upon a beam which tips under a predetermined load in the pan, and power actuated means, comprising a cam, for restoring the beam to normal position after discharge of the load, said cam having a dwell portion constructed and arranged positively to hold the beam in normal position for a predetermined limited time after its restoration.

16. A machine of the class described comprising a scale pan mounted upon a beam which tips under predetermined load, a lever provided with an arm engageable with a part carried by the beam and a second arm provided with a cam, and a rotating member engageable with the cam for swinging the lever to restore the beam to normal position after dumping of the load, said cam having a dwell portion so constructed and arranged as positively to retain the beam in normal position for a predetermined limited time after its restoration.

17. A machine of the class described comprising a scale pan supported by a beam which tips under predetermined load in the pan, and means for restoring the beam to normal position after dumping the load which comprises a lever having an arm engageable with a part carried by the beam and a second arm provided with a cam, a power driven shaft provided with a crank arm, and a crank pin adjustable longitudinally of the crank arm and engageable with the cam for actuating the lever.

18. A machine of the class described comprising a scale pan pivotally supported upon a beam which tips under predetermined load in the pan, a normally inoperative stop device for damping oscillation of the pan about its pivotal axis, means for restoring the beam to normal position after dumping of its load comprising a three armed lever having one arm disposed for engagement with a part carried by the beam, a second arm provided with a cam, and a third arm connected to the stop device, and a rotating crank pin engageable with the cam for swinging the lever, the cam having a dwell so arranged as positively to hold the beam in normal position for a predetermined interval whereby to permit the stop device to damp the oscillations of the pan as it resumes normal position.

19. A machine of the class described comprising a scale beam and a scale pan supported thereby, the pan having a movable wall, latch means normally operative to retain the wall in closed position, said latch means comprising an actuating pin, and a lever arm normally positioned below the lower limit of movement of said pin with the pan as the latter descends under load and movable to restore the pan and beam to normal position.

20. A machine of the class described comprising a scale beam and a pan supported thereby, a pin projecting from the end of the pan and movable downwardly therewith as the beam tips under load, a lever arm normally positioned adjacent to the lower limit of free movement of the pin, and power actuated means for moving the lever arm whereby to lift the pin and thereby restore the pan and beam to normal position.

21. A machine of the class described comprising a dumping scale pan having a movable wall, a latch normally retaining the wall in closed position, and means for releasing the latch to dump the pan comprising an adjustable lever arm having one extremity normally positioned closely adjacent to the latch, and power actuated means, including a cam element, for moving the lever arm to bring its extremity into operative engagement with the latch.

22. A machine of the class described comprising a dumping scale pan having a movable closure and a latch for retaining the latter in normal position, and means for releasing the latch to dump the pan comprising a lever having an arm terminating immediately above the latch when in normal position, a second arm provided with a cam, and a rotating crank arm having a crank pin engageable with said cam for swinging the lever whereby operatively to engage the end of its first named arm with the latch.

23. A machine of the class described comprising a scale beam supporting a dumping scale pan having a latch controlled closure, a power driven shaft, and means actuated by said shaft for releasing the latch to dump the pan, for restoring the beam to normal position after it has tipped under load, and for closing the pan and resetting the latch.

24. A machine of the class described comprising a scale beam, a dumping scale pan supported thereby, said pan having a closure and a latch normally holding the latter in closed position, power actuated means, independent of tipping of the beam under load, for releasing the latch to dump the pan, and means operative to restore the emptied pan to normal position with its closure shut and the latch reset.

25. A machine of the class described comprising a scale beam, a dumping scale pan supported thereby, a movable closure for the pan, power actuated means for initiating opening of said closure, and independent power actuated means for restoring said closure to normal position.

26. A machine of the class described comprising a scale beam, a dumping scale pan supported thereby, said pan having a normally closed movable wall, a power driven shaft, and two independent mechanisms actuated in timed relation by the shaft, one of said mechanisms operating to initiate opening of the movable wall of the pan, and the other to restore said wall to normal position.

27. A machine of the class described comprising a scale beam, a dumping scale pan supported thereby, said pan having a normally closed movable wall, a pair of vertically spaced elements normally free from contact with parts supported by the scale beam, and means for moving said elements in timed relation whereby first to initiate opening of the wall of the pan and thereafter to restore said wall to normal position.

28. A machine of the class described comprising a scale beam, a scale pan provided with a normally closed movable wall, a pair of levers having vertically spaced extremities normally free from contact with parts supported by the scale beam, a power shaft, and means actuated thereby for moving one of said levers to initiate opening of the movable wall of the pan and thereafter to move the other lever to restore said wall to normal position.

29. A machine of the class described comprising a scale beam, a dumping scale pan supported thereby, said pan having a movable wall, a latch normally holding the wall in closed position, a lever for releasing the latch to dump the pan, a second lever constructed and arranged to engage a part carried by the beam and to restore the latter to normal position after tipping under load, said second lever also closing the movable wall of the pan after dumping, and a power driven shaft for actuating said levers in timed relation.

30. A machine of the class described comprising a scale beam supporting a dumping scale pan having a latch controlled closure, a power driven shaft having a pair of crank arms thereon, crank pins carried by the respective arms, and a pair of levers operable by the respective crank pins, one of said levers having a latch releasing element, and the other lever being constructed and arranged to restore the pan to normal position after dumping and to reset the latch.

Signed by me at Boston, Mass., this 3rd day of May 1923.

JOSEPH B. HOWE.